US009064129B2

(12) United States Patent
Kounga et al.

(10) Patent No.: US 9,064,129 B2
(45) Date of Patent: Jun. 23, 2015

(54) MANAGING DATA

(75) Inventors: Gina Kounga, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 115 days.

(21) Appl. No.: 13/882,692

(22) PCT Filed: Apr. 7, 2011

(86) PCT No.: PCT/US2011/031593
§ 371 (c)(1),
(2), (4) Date: Apr. 30, 2013

(87) PCT Pub. No.: WO2012/064378
PCT Pub. Date: May 18, 2012

(65) Prior Publication Data
US 2013/0227281 A1   Aug. 29, 2013

(30) Foreign Application Priority Data
Nov. 8, 2010   (GB) .................................. 1018836.5

(51) Int. Cl.
*H04L 9/00* (2006.01)
*G06F 21/62* (2013.01)
*G06F 21/44* (2013.01)
*G06F 9/455* (2006.01)

(52) U.S. Cl.
CPC ............ *G06F 21/6209* (2013.01); *G06F 21/44* (2013.01); *G06F 21/6245* (2013.01); *G06F 21/6263* (2013.01); *G06F 2009/45587* (2013.01); *G06F 2221/2105* (2013.01)

(58) Field of Classification Search
CPC ................ G06F 21/44; G06F 21/6245; G06F 2009/45587; G06F 21/6209; G06F 2221/2105; G06F 21/6263
USPC ................ 713/165, 189, 193; 380/277; 726/2
See application file for complete search history.

(56) References Cited

U.S. PATENT DOCUMENTS

| 7,428,636 | B1 | 9/2008 | Waldspurger et al. |
| 7,467,370 | B2 | 12/2008 | Proudler et al. |
| 7,469,346 | B2 | 12/2008 | Watson |
| 2005/0060561 | A1 | 3/2005 | Pearson et al. |
| 2006/0131397 | A1 | 6/2006 | Reddy et al. |
| 2007/0204153 | A1 | 8/2007 | Tome et al. |
| 2008/0178257 | A1 | 7/2008 | Mishina et al. |

(Continued)

OTHER PUBLICATIONS

An Open Trusted Computing Architecture-Secure Virtual Machines Enabling User-defined Policy Enforcement: D Kuhlmann, R Landfermanny, et al.: Jun. 28, 2006.

(Continued)

*Primary Examiner* — Baotran N To
(74) *Attorney, Agent, or Firm* — Hewlett-Packard Patent Department

(57) ABSTRACT

One example discloses a data manager of a data collector (DCDM) executing on a virtual machine for managing sensitive data. The DCDM can have a conformance certificate that characterizes functionality of the DCDM. The DCDM can request sensitive data from a data subject, wherein the request for the sensitive data includes the conformance certificate. The DCDM can further receive, in response to the request, the sensitive data encrypted with an encrypted secret key. The secret key can be decrypt-able with a private key stored at a trusted platform module for the data collector (DCTPM).

15 Claims, 5 Drawing Sheets

(56) References Cited

U.S. PATENT DOCUMENTS

| | | |
|---|---|---|
| 2008/0276086 A9 | 11/2008 | Proudler et al. |
| 2009/0094673 A1 | 4/2009 | Seguin et al. |
| 2009/0282266 A1 | 11/2009 | Fries et al. |
| 2010/0161998 A1 | 6/2010 | Chen et al. |
| 2010/0185546 A1 | 7/2010 | Pollard |
| 2010/0332820 A1* | 12/2010 | Matsushima et al. ......... 713/150 |
| 2014/0095868 A1* | 4/2014 | Korthny et al. ............... 713/165 |

OTHER PUBLICATIONS

International Search Report and Written Opinion Received in PCT Application No. PCT/US2011/031593, mailed Nov. 29, 2011, pp. 9.

* cited by examiner

← 100

```
DS ID
DC ID
Name, d1, ENC(SK, John)
Surname, d2, ENC(SK, Doe)
Date of birth, d3, ENC(SK, 25 November 1956)
Preferences1
        - Target : d1, d2
        - Authorized principal : DC, TP1, TP2, Applications certified
          by conformance authority ConfAuth1
        - Access and use until : certificateissuedate + 3 months
Preferences2
        - Target:d3
        - Authorized principal DC, TP1, Applications certified by
          conformance authority ConfAuth2
        - Access and use until: unlimited
ENC(PDM-PubKeyDC, SK)
Issuance date
SIG(PrivAIKDS, PDC DSs fields)
```

FIG. 3

MANAGING DATA

RELATED APPLICATIONS

This application is a U.S. National Stage Application of and claims priority to International Patent Application No. PCT/US2011/031593 filed on Apr. 7, 2011 and entitled "DATA MANAGER;" which claims priority to Great Britain Patent Application No. GB1018836.5 filed on Nov. 8, 2010 and entitled "DATA MANAGER", the subject matter of which is entirely incorporated herein by reference.

BACKGROUND

A virtual machine (VM) may be a software implementation of a computer that executes programs like a physical computer. Virtual machines may be separated into two general categories, based on their use and degree of correspondence to any real machine. A system virtual machine may provide a complete system platform which supports the execution of a complete operating system (OS). A process virtual machine may be designed to run a single program, which means that it supports a single process. One characteristic of a virtual machine may be that the software running inside operates on the resources and abstractions provided by the virtual machine.

BRIEF DESCRIPTION OF THE DRAWINGS

FIG. 3 illustrates an example of a data certificate that includes sensitive data.

DETAILED DESCRIPTION

Sensitive data (e.g., personal data, financial data or the like) received from a data subject can be securely managed by a data collector. Moreover, by employment of a conformance certificate of the data collector, a user (or other entity) of the data subject may be assured that the data collector will only employ the sensitive data in a manner (i) acquiesced by the data collector at the time of issuance of the conformance certificate and (ii) described in a data certificate for the sensitive data submitted to the data collector. In some examples, the data certificate can describe limitations on use of the sensitive data, including a time period that the data collector can retain the sensitive data. Additionally, the data certificate can identify third parties that are authorized to receive the sensitive data. Moreover, in some examples, the data subject can unilaterally revoke the personal data (e.g., before an expiration time identified in the data certificate).

Figure 1:
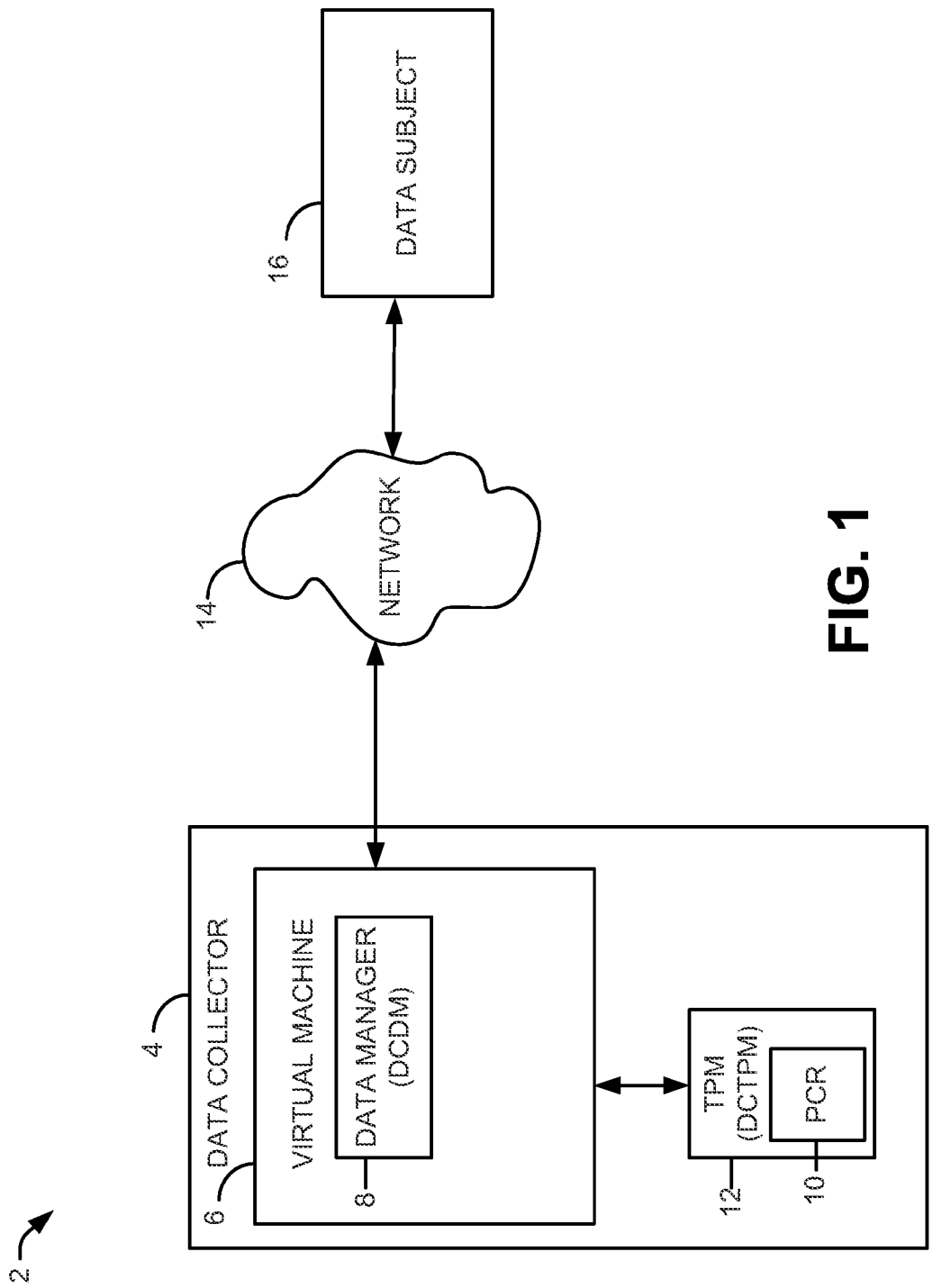
FIG. 1 illustrates an example of a system for controlling the use and distribution of data.

FIG. 1 illustrates an example of a system 2 for controlling the use and distribution (e.g., management) of data. The system 2 can include, for example, a data collector 4 that executes a virtual machine 6 stored on a computer readable medium, such as random access memory (RAM), flash memory, a hard drive or the like.

The virtual machine 6 can execute a data manager 8 for the data collector 4, which is referred to as a data collector data manager (DCDM) 8. The DCDM 8 can be employed to securely receive, manipulate, and distribute sensitive data (e.g., personal information, financial information, or the like).

As one example, the DCDM 8 could be implemented as an application for a retail and/or a financial agency (e.g., an on-line store, a bank or the like). However, the DCDM 8 could be implemented in other situations as well. The DCDM 8 can include a conformance certificate, which can be issued, for example, by a conforming authority that characterizes the integrity and functionality (e.g. capabilities) of the DCDM 8. A trusted platform module (TPM) 12 of the data collector 4, referred to as a data collector TPM (DCTPM) 12, can generate and store a Platform Configuration Register (PCR) 10 that includes a generated code that characterizes the configuration of the DCDM 8 at the time of issuance of the conformance certificate. As described herein, a TPM (including the DCTPM 12) can be employed to store and/or generate cryptographic keys, and can be implemented, for example, as an integrated circuit chip embedded in a computer, such as corresponding to the data collector 4.

The DCDM 8 can communicate over a network 14, for example, with a data subject 16. The data subject 16 could be implemented, for example, as an application employed by a user accessing the data collector 4 (e.g., a customer, a patron of a bank or the like). In such a situation, it can be desirable by the user to control the employment and distribution of sensitive data (e.g., personal information, financial records or the like). In the present examples, assurances can be provided to the user that the sensitive data is employed in a known manner and the sensitive data is only accessible by parties known to the user. However, data subject 16 could be implemented in other situations as well. The network 14 can be implemented, for example as a wide area network, such as the Internet, or another type or local or wide area network. The DCDM 8 can request sensitive data from the data subject 16. Along with a request, the DCDM 8 can provide the conformance certificate that verifies the integrity of the DCDM 8. Upon receiving the request, the data subject 16 and the DCDM 8 can mutually validate each other. The data subject 16 can review the conformance certificate from the DCDM 8 to ensure that the DCDM 8 can securely manage the sensitive data. Additionally, the data subject 16 and the DCDM 8 can exchange messages to verify that the DCDM 8 has not been altered since the issuance of the conformance certificate. If the data subject 16 finds adequate assurance that the DCDM 8 can be trusted to securely manage the sensitive data, the data subject 16 can issue a data certificate. The data certificate can include, for example, encrypted sensitive data, limitations on use of that sensitive data (e.g., expiration date) and a list of authorized third parties (other than the DCDM 8) that are also permitted to receive the sensitive data. The sensitive data can be encrypted for example, with a secret key that is provided to the DCDM 8 encrypted with the public key of the DCDM 8, wherein the corresponding private key is stored at the DCTPM 12.

Upon receiving the sensitive data, the DCDM 8 can store the sensitive data in the encrypted form. Upon the DCDM 8 determining that access to the sensitive data is needed, the DCDM 8 can send a request for decryption of the secret key to the DCTPM 12. The request for decryption can include the PCR 10. The DCTPM 12 can check the integrity of the DCDM 8 by employing a stored measurement log for the DCDM 8 and the PCR 10. In this manner, the DCTPM 12 can verify that no changes have been made to the DCDM 8 since the conformance certificate was issued. If the integrity of the DCDM 8 is verified by the DCTPM 12, the DCTPM 12 can decrypt the secret key by employing the private key corresponding to the DCDM's 8 public key and return the decrypted secret key to the DCDM 8. The DCDM 8 can thus employ the secret key to decrypt the sensitive data. Thus, the sensitive data can be employed in the manner agreed upon based on the limitations set forth in the data certificate, as well as the limitations agreed-upon for issuance of the conformance certificate.

Moreover, in some examples, in a similar fashion, the DCDM 8 can distribute the sensitive data to third parties listed in the data certificate. However, before the sensitive data can be released to the third parties, the DCDM 8 verifies the integrity and capabilities of such third parties by employing a process similar to the verification of the DCDM 8 by the data subject 16. By employing the system 2, a user of the data subject 16 may be assured that the sensitive data is securely stored and distributed to only parties known to the data subject 16, and that the sensitive data is employed in the manner specified in the data certificate.

Figure 2:
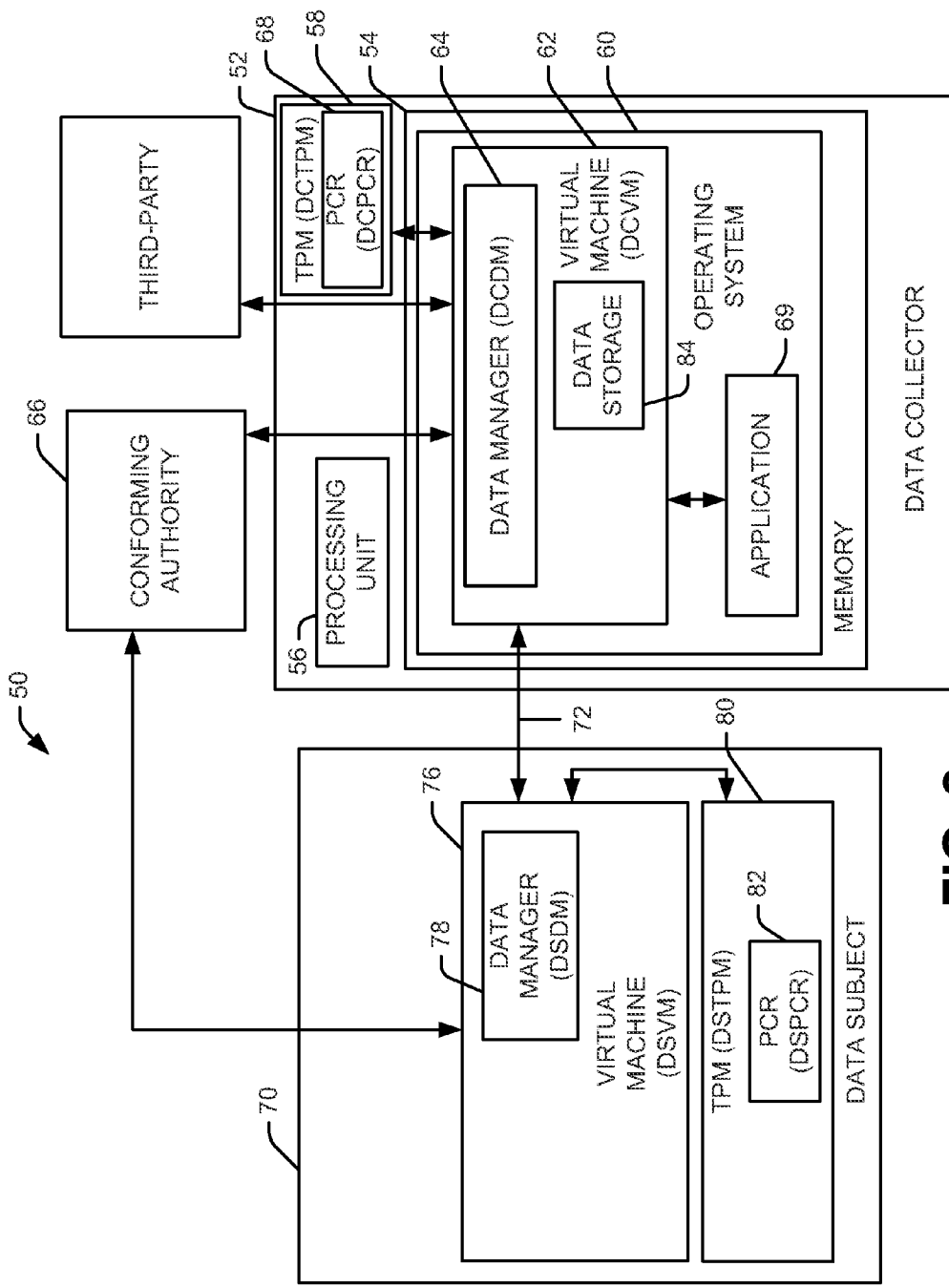
FIG. 2 illustrates another example of a system for controlling the use and distribution of sensitive data.

FIG. 2 illustrates an example of a system 50 for controlling the use and distribution (e.g., management) of data. The system 50 can include, for example, a data collector 52 that can be implemented, for example, as a computer system for managing sensitive data. In some examples, the data collector 52 can be implemented as a server system, such as a server that collects sensitive data (e.g., personal information, financial information or the like). The data collector 52 can include a memory 54 for storing computer executable instructions. The memory 54 can be implemented, for example, as a computer readable medium. The memory 54 can be implemented, for example, as RAM, flash memory, nonvolatile memory (e.g., a hard drive) or the like. The data collector 52 can also include a processing unit 56 to access the memory 54 and execute computer executable instructions. The processing unit 56 can be implemented, for example, as one or more processor cores. The data collector 52 can further include a TPM 58 that can be employed to store and/or generate cryptographic keys, which TPM (being part of the data collector 52) can be referred to as a DCTPM 58. An operating system 60 for the data collector 52 can be included in the memory 54 of the data collector 52.

A virtual machine 62, isolated from the operating system 60 can execute on the operating system 60, which virtual machine 62 (being part of the data collector 52) can be referred to as a data collector virtual machine (DCVM) 62. The DCVM 62 can operate as a separate entity from the data collector 52, such that the DCVM 62 can be assigned its own network address, and the DCVM 62 can communicate with other entities, for example through a virtual network connection, a physical network connection of the data collector 52, or a combination of both. The DCVM 62 can include a data collector data manager (DCDM) 64 operating within the virtual machine 62 of the data collector 52. Upon activation of the DCDM 64, the DCDM 64 can request a conformance certificate from a conforming authority 66. The conforming authority 66 can be implemented as a trusted entity that can verify the integrity of the DCDM 64, as well as ensure that agreed-upon capabilities and limitations of the DCDM 64 are met. In some examples, the conforming authority 66 can distribute the DCDM 64 to the data collector 52. The request for the conformance certificate can include, for example, a license key issued by the conforming authority 66.

Upon receiving the request for the conformance certificate, the conforming authority 66 can provide a nonce to the DCDM 64 to initiate an authorization request of the DCDM 64. The nonce can be implemented, for example, as a string of unpredictable characters. In response to receiving the nonce, the DCDM 64 can request a key pair generation from the DCTPM 58. In response, the DCTPM 58 can provide the DCDM 64 with a data manager certificate, which certificate can be referred to as a DCDM-CERT. The DCDM-CERT can be signed with a private identity key generated for the DCDM 64, which private identity key can be stored at the DCTPM 58. The DCDM-CERT can also include a principal public key for the DCDM 64. Additionally, the DCTPM 58 can provide the DCDM 64 with an identity certificate, which can be referred to as a DCDM-ID_CERT. The DCDM-ID_CERT can be employed as a public key certificate that can attest to the identity of the DCDM 64, and the DCDM-ID_CERT can include a public identity key for the DCDM 64, which public identity key can be the complementary key to the private identity key stored in the DCTPM 58. In response, the DCDM 64 can provide the DCTPM 58 with the nonce (received from the conforming authority 66) along with an identifier for the DCDM (DCDM-ID) and the license key. The DCTPM 58 can generate and store a corresponding PCR 68 in response to the nonce and the identifier, which PCR includes a generated code that characterizes a current configuration state of the DCDM 64, which PCR 68 can be referred to as a DCPCR 68.

The DCDM 64 can sign the DCDM-ID, the nonce and the license key with a principal private key for the DCDM 64, which principal private key can be the complementary key to the principal public key for the DCDM 64. A first data structure resulting from the signing and the DCPCR 68 can be in turn be signed with a private identity key for the DCDM 64, which private identity key can be the complementary key to the public identity key for the DCDM 64. A second data structure resulting from the second signing along with a current stored measurement log for the DCDM 64 can be provided to the DCDM 64. The stored measurement log for the DCDM 64 can be implemented as data that characterizes a current configuration state of the DCDM 64, and can be employed to re-generate the DCPCR 68.

The DCDM 64 can provide the conforming authority 66 with the second data structure, the stored measurement log for the DCDM 64, the DCDM-ID_CERT and the DCDM-CERT. The conforming authority 66 can verify the signature of the DCTPM 58 by employing, for example, the public identity key of the DCDM 64 (included in the DCDM-ID_CERT) and the principal public key of the DCDM 64 (included in the DCDM-CERT). Verification of the signature may ensure to the conforming authority 66 that the DCTPM 58 is operating properly, and operating under predefined standards, such as standards set by the International Organization for Standardization (ISO), thereby authenticating the DCTPM 58. Moreover, the conforming authority 66 can employ the received stored measurement log and generate a new PCR. This new PCR can be compared with the DCPCR 68 of the second data structure to ensure that no changes to the DCDM 64 have been made since the DCPCR 68 of the second data structure was generated. In this manner, the conforming authority 66 can verify the integrity of the DCDM 64, and verify the authenticity of the DCTPM 58. Moreover, the newly generated PCR and/or the DCPCR 68 of the second data structure can be compared to an expected DCPCR stored at the conforming authority 66, which comparison ensures that the DCDM 64 operates in a manner agreed-upon, including providing agreed-upon functionality and limitations regarding operations performed on sensitive data. If the verification is successful, the conforming authority 66 can issue the DCDM 64 the conformance certificate, which can be referred to as a DCDM-CONFORM-CERT.

Upon receiving the DCDM-CONFORM-CERT the DCDM 64 is ready to securely receive and manage sensitive data. Thus, at some later point in time, another application 69, such as a software application executing on the same operating system 60 as the data collector 52, can send a message (via a virtual network connection) to the DCDM 64 requesting that a particular set of sensitive data be collected from a data subject 70. Additionally or alternatively, in some examples, the DCDM 64 itself can recognize the need to collect the sensitive data from the data subject 70. The data subject 70 can be implemented, for example, as a second computer that can communicate with the data collector 52, for example over a network, such as the Internet. As an example, the data subject 70 could be implemented as a laptop computer, a desktop computer, a personal digital assistant (PDA), a smart phone or the like. As another example, the data subject 70 and the data collector 52 could be implemented on the same computer system.

In response to recognition by the DCDM 64 of the need to collect the sensitive data from the data subject 70, a communication link 72 (e.g., a physical and/or a virtual network connection) can be established between the DCDM 64, and a virtual machine 76 executing on the data subject 70, which can be referred to as a DSVM 76. Moreover, by employing the communication link 72, the DCDM 64 can send a request for the sensitive data to a data manager 78 that executes in the DSVM 76, which data manager 78 can be referred to as a DSDM 78.

At some point in time, the DSDM 78 can be validated by the conforming authority 66 in a manner similar to the process described herein for the validation of the DCDM 64 before the issuance of the DCDM-CONFORM-CERT. The validation process can be initiated by requesting a conformance certificate for the DSDM 78, which can be referred to as a DSDM-CONFORM-CERT. Thus, during such a validation process, a TPM 80 for the data subject 70, which can be referred to as a DSTPM 80, can be validated by the conforming authority 66. Additionally, during such validation process, an identity certificate for the data subject 70 can be created, which certificate can be referred to as a DS-ID_CERT. The DS-ID_CERT can include, for example, a public identity key generated by DSTPM 80, wherein the complementary private identity key is stored at the DSTPM 80. Additionally, during the validation process, a certificate for the DSDM 78 can be generated, which certificate can be referred to as a DSDM-CERT. The DSDM-CERT can include a public key for the DSDM 78, wherein the DSTPM 80 can store the private key for the DSDM 78 that is complementary to the public key for the DSDM 78. Still further, during the validation process, a data subject PCR (DSPCR) 82 can be generated and stored at the DSTPM 80. The DSPCR 82 can include code generated based on a current configuration of the DSDM 78. Furthermore, upon completing the validation process, the conforming authority 66 can issue the DSDM 78 to the DSDM-CONFORM-CERT, which can identify the capabilities and limitations of the DSDM 78.

In response to the request for the sensitive data, the DSDM 78 and the DCDM 64 can exchange messages to mutually validate each other. For example, the DSDM 78 can generate a nonce and provide the nonce to the DCDM 64 in a first message, which nonce can be referred to as a nonceDS. In response, the DCDM 64 can generate another nonce, which nonce can be referred to as a nonceDC. The DCDM 64 can employ the DCTPM 58 to generate a current stored measurement log for the DCDM 64. Additionally, the DCDM 64 can employ the DCTPM 58 to sign the nonceDS and the DCPCR 68 with the private identity key of the data collector 52, which private identity key is stored at DCTPM 58 to generate a first signed data structure. The DCDM 64 can provide the DSDM 78 with a second message that includes (i) the first signed data structure, (ii) the nonceDC, (iii) the DC-CONFORM-CERT, (iv) the DC-ID_CERT, (v) the DCDM-CERT and (vi) the stored measurement log for the DCDM 64.

In response, the DSDM 78 can employ the data provided in the second message to verify that the DCDM 64 operates in a manner prescribed by the conforming authority 66, for example, by validating a signature in the DC-CONFORM-CERT. Additionally, by validating a signature in the DC-ID_CERT and the DCDM-CERT, the DSDM 78 can validate that the DCTPM 58 is genuine, and conforms to the predefined standards. Furthermore, by generating a new PCR based on the stored measurement log for the DCDM 64 of the second message, and comparing the new PCR with the DCPCR 68 of the first signed data structure in the second message, the DSDM 78 can be assured that no changes have been made to the DCDM 64 since the DC-CONFORM-CERT was issued. Finally, by the inclusion of the signed nonceDS in the first signed data structure, the DSDM 78 is assured that the second message was generated after the first message.

Upon the DSDM 78 conducting the validations of the DCDM 64 and the DCTPM 58, the DSDM 78 can employ the DSTPM 80 to sign the nonceDC and the DSPCR 82 with the private identity key of the data subject 70 to generate a second signed data structure. Additionally, the DSDM 78 can generate a secret key. The secret key can be implemented, for example, as a symmetric key that can be employed to encrypt and decrypt data. Furthermore, the DSDM 78 can generate a current stored measurement log by employing the DSTPM 80 that characterizes a current state of the DSDM 78. Further still, the DSDM 78 can generate a data certificate, which data certificate can be referred to as a DSDC.

FIG. 3 illustrates an example of a data certificate 100 that could be employed, for example, as the DSDC described with respect to FIG. 2. The data certificate 100 can include, for example, an identifier of the data subject (labeled in FIG. 3 as "DS ID") and an identifier of the data collector (labeled in FIG. 3 as "DC ID"). The data certificate 100 can also include sensitive data fields. In the present example, the sensitive data fields include a name, a surname and a date of birth, but it is understood that other data fields could be implemented as well. Each of the sensitive data fields includes a label that identifies the particular data field (labeled in FIG. 3 as "d1", "d2" and "d3"). Each of the data fields includes the corresponding piece of sensitive data, wherein the sensitive data is encrypted (as noted by the notation "ENC" in FIG. 3) with a secret key (labeled in FIG. 3 as "SK"). Additionally, the data certificate 100 can include data corresponding to a first set of preferences (labeled in FIG. 3 as "Preferences1"). The first set of preferences can include a target identifier of particular data fields (d1 and d2) to which the first of preferences are applicable. The first set of preferences also includes a list of principals (agents) that are authorized to receive the data fields identified by the target identifier. In the present example, a data collector (labeled in FIG. 3 as "DC") and a first and second third-party (labeled in FIG. 3 "TP1" and "TP2"), as well as application certified by a first conforming authority (labeled in FIG. 3 as "ConfAuth1"). The first set of preferences can still further include limitations on access to the data fields identified by the target identifier. In the present example, rights and privileges to access and use the data fields identified by the target identifier expire three months from the issuance of the data certificate 100. In other examples, other limitations, such as limitations on methods and functions that can be performed on the data fields identified by the target identifier can additionally or alternatively be included.

In a similar manner, a second set of preferences (labeled in FIG. 3 as "Preferences2") can be included. Furthermore, the data certificate 100 can include the secret key encrypted by a public identity key (labeled in FIG. 3 as "PDM-PubKeyDC")

of the data collector (e.g., included in DC-ID_CERT). The data certificate 100 can also list an issuance date (labeled in FIG. 3 as "Issuance date") of the data certificate 100. Furthermore, the data certificate 100 can also sign (as noted by the notation "SIG" in FIG. 3) the data certificate 100 and the encrypted sensitive data fields with a private identity key of the data subject (labeled in FIG. 3 as "PrivAIKDS").

Referring back to FIG. 2, the DSDM 78 can provide a third message to the DCDM 64 that includes (i) the second signed data structure, (ii) the DS-CONFORM-CERT (iii) the DS-ID_CERT, (iv) the DSDM-CERT (v) current stored measurement log for the DSDM 78 and (vi) the DSDC. In response to the third message, the DCDM 64 can validate the data subject 70 in a manner similar to the method of validation performed by the DSDM 78 on the data collector 52 to complete the mutual validation. For instance, the DCDM 64 can employ the data provided in the third message to verify that the DSDM 78 operates in a manner prescribed by the conforming authority 66, for example, by validating a signature in the DS-CONFORM-CERT. Additionally, by validating a signature in the DS-ID_CERT and the DSDM-CERT, the DCDM 64 can confirm that DSTPM 80 is genuine, and conforms to the predefined standards. Furthermore, by generating a new PCR based on the stored measurement log for the DSDM 78 of the third message, and comparing the new PCR with the DSPCR 82 of the second signed data structure in the third message, the DCDM 64 may be assured that no changes have been made to the DSDM 78 since the DS-CONFORM-CERT was issued. Finally, by the inclusion of the signed nonceDC in the second signed data structure, the DCDM 64 may be assured that the third message was generated after the first message.

Therefore, upon the exchange of the first, second and third messages, the DCDM 64 and the DSDM 78 can mutually verify that they both have the following properties: (a) run on platforms equipped with a genuine TPM that include security components and properties that are genuine; (b) are healthy data managers (e.g., no changes of the made, and they are both functioning properly); and (c) hold valid public keys that are certified by DSTPM 80 and DCTPM 58, respectively.

Upon validating the DSDM 78, the DCDM 64 can store the DSDC in the data storage 84 of the DCVM 62. In some examples, the DCDM 64 can extract the encrypted sensitive data fields and store them in an unsecure location (e.g., memory 54 of the data collector 52), and the sensitive data fields will be inaccessible since they are encrypted. In such a situation, the DCDM 64 could maintain a link between the DSDC and the extracted sensitive data fields.

At some point in time, the DCDM 64 may need to access the sensitive data included in the DSDC. In an example, this need may arise based on operations performed at the DCDM 64. In such a situation, the DCDM 64 can examine the DSDC to determine if the DCDM 64 is authorized to employ the sensitive data in a manner complying with the preferences set forth in the DSDC. If the determination is negative (e.g. DCDM 64 not authorized), the DCDM 64 can, for example, simply delete the DSDC, as well as any sensitive data fields extracted therefrom. If the determination is positive (e.g., confirming that DCDM 64 is authorized), the DCDM 64 can extract the encrypted secret key from the data certificate. The DCDM 64 can forward the encrypted secret key to the DCTPM 58 with a request for decryption of the secret key. The request for decryption can include, for example, a copy of the principal public-key for the DCDM 64, and the DCPCR 68. The DCTPM 58 can revalidate the DCDM 64 by performing an integrity check, for example by employing the DCPCR 68 and generating a new PCR based on a current stored measurement log for the DCDM 64. Such an integrity check can ensure that the DCDM 64 has not been altered (e.g., hacked) since the DCPCR 68 was created. Upon passing the integrity check and completing the revalidation process, the DCTPM 58 can forward the DCDM 64 a decrypted copy of the secret key. The DCDM 64 can then employ the decrypted secret key to decrypt the sensitive data (or some portion thereof) included in the DSDC, thereby providing access for the DCDM 64 to the sensitive data. Moreover, upon completion of the access to the sensitive data, the DCDM 64 can delete the decrypted sensitive data, leaving only the securely stored encrypted copy of the sensitive data at the data collector 52.

In another example, the DCDM 64 can receive a request for the sensitive data from a third-party 86, such as another application. The third-party 86 can be executing in a virtual machine on the same computer as the data collector 52, or on a virtual machine executing on a different computer system. In the example system 50, to receive the sensitive data, the third-party 86 can request and receive a conformance certificate, which can be referred to as a TP_CONFORM_CERT in a manner similar to the process for validation at the conforming authority 66 described with respect to the DCDM 64. For purposes of simplification of explanation, that process is not repeated, but results in the same (or similar) validation of the third-party 86, and the third-party's associated TPM, which TPM can be referred to as a TPTPM.

Upon receiving the request for the sensitive data by the third-party 86, the DCDM 64 can examine the DSDC to determine (i) if the DCDM 64 is authorized to employ the sensitive data in a manner complying with the preferences set forth in the DSDC, and (ii) if the third-party 86 is authorized to receive the sensitive data. If the first (i) determination is negative (e.g., DCDM 64 not authorized), the DCDM 64 can, for example, simply delete the DSDC, as well as any sensitive data fields extracted therefrom. If the second (ii) determination is negative (e.g., third-party 86 not authorized), the DCDM 64 can send a message denying the request for the sensitive data.

If both determinations are positive (e.g., DCDM 64 and third-party 86 authorized), the DCDM 64 can extract the encrypted secret key from the data certificate. The DCDM 64 can forward the DCTPM 58 a request for decryption of the secret key. The request for decryption can include, for example, a copy of the principal public-key for the DCDM 64, and the DCPCR 68. The DCTPM 58 can revalidate the DCDM 64 by performing an integrity check, for example by employing the DCPCR 68 and generating a new PCR based on a current stored measurement log for the DCDM 64. Such an integrity check can ensure that the DCDM 64 has not been altered (e.g., hacked) since the DCPCR 68 was created. Upon passing the integrity check, the DCTPM 58 can forward the DCDM 64 a decrypted copy of the secret key. The DCDM 64 can employ the decrypted secret key to decrypt the sensitive data included in the DSDC, thereby providing access for the DCDM 64 to the sensitive data.

Upon decrypting the sensitive data, the DCDM 64 can exchange messages with the third-party 86 to mutually validate the third-party 86 in a manner similar to the mutual validation between the DSDM 78 and the DCDM 64. For purposes of simplification of explanation, the mutual validation process is not repeated herein. Upon (or during) such a mutual validation, the DCDM 64 can generate a secret key, encrypt the sensitive data requested by the third-party 86 with the secret key and encrypt the secret key with a principal public-key of the third-party 86, wherein a complementary principal private key of the third-party 86 is stored at the TPTPM. Upon encrypting the sensitive data requested by the third-party 86, the DCDM 64 can delete the decrypted version of the sensitive data requested by the third-party 86. The DCDM 64 can provide the third-party 86 a message that includes (i) the encrypted sensitive data requested by the third-party 86, (ii) the encrypted secret key and (iii) a copy of preferences (extracted from the DSDC) for that requested sensitive data. The DCDM 64 can record a copy of the correspondence between the DCDM 64 and the third-party 86, such that the DCDM 64 can track a list of third parties that have received sensitive data (or some portion thereof). Upon receiving the message, the third-party 86 can access (and distribute) the sensitive data in a manner similar to the process described with respect to the DCDM 64.

In some examples, the DSDM 78, the DCDM 64 and the third-party 86 can be programmed to allow the DSDM 78 to unilaterally alter preferences associated with sensitive data in the DSDC. For instance, should a user of the DSDM 78 desire to immediately remove personal data regarding him/herself from the DCDM 64 and/or the third-party 86, the DSDM 78 can send a revocation request to the DCDM 64. In some examples, compliance with such a revocation request can be a feature needed by the DCDM 64 and/or the third-party 86 in order for the conforming authority 66 to issue the DCDM-CONFORM-CERT and/or the TP-CONFORM-CERT. Upon receiving a request for alteration of the preferences, and the DSDM 78 can change preferences in the DSDC or delete the DSDC, and send a notification to any third-party 86 that receives the sensitive data to do the same.

By employing the system 50, a user may be confident the sensitive data will be accessible only to entities known to the DSDM 78, and that the sensitive data is employed only in a manner prescribed by the DSDM 78. Moreover, the system 50 can be implemented on nearly any platform, since the disclosed data managers (e.g., the DSDM 78 and the DCDM 64) operate on virtual machines.

Figure 4A:
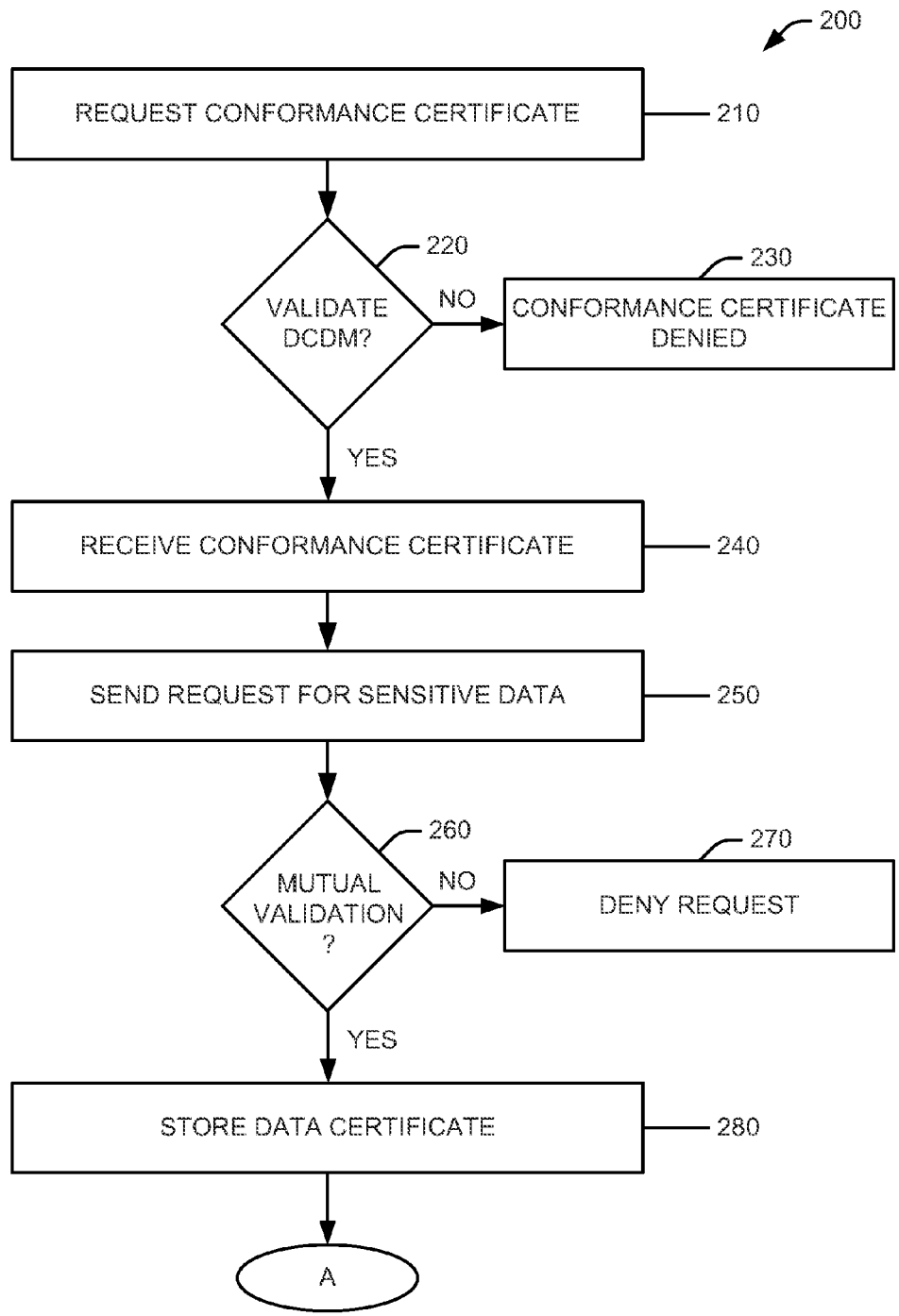
FIGS. 4A and 4B illustrate a flowchart of an example method for managing sensitive data.
Figure 4B:
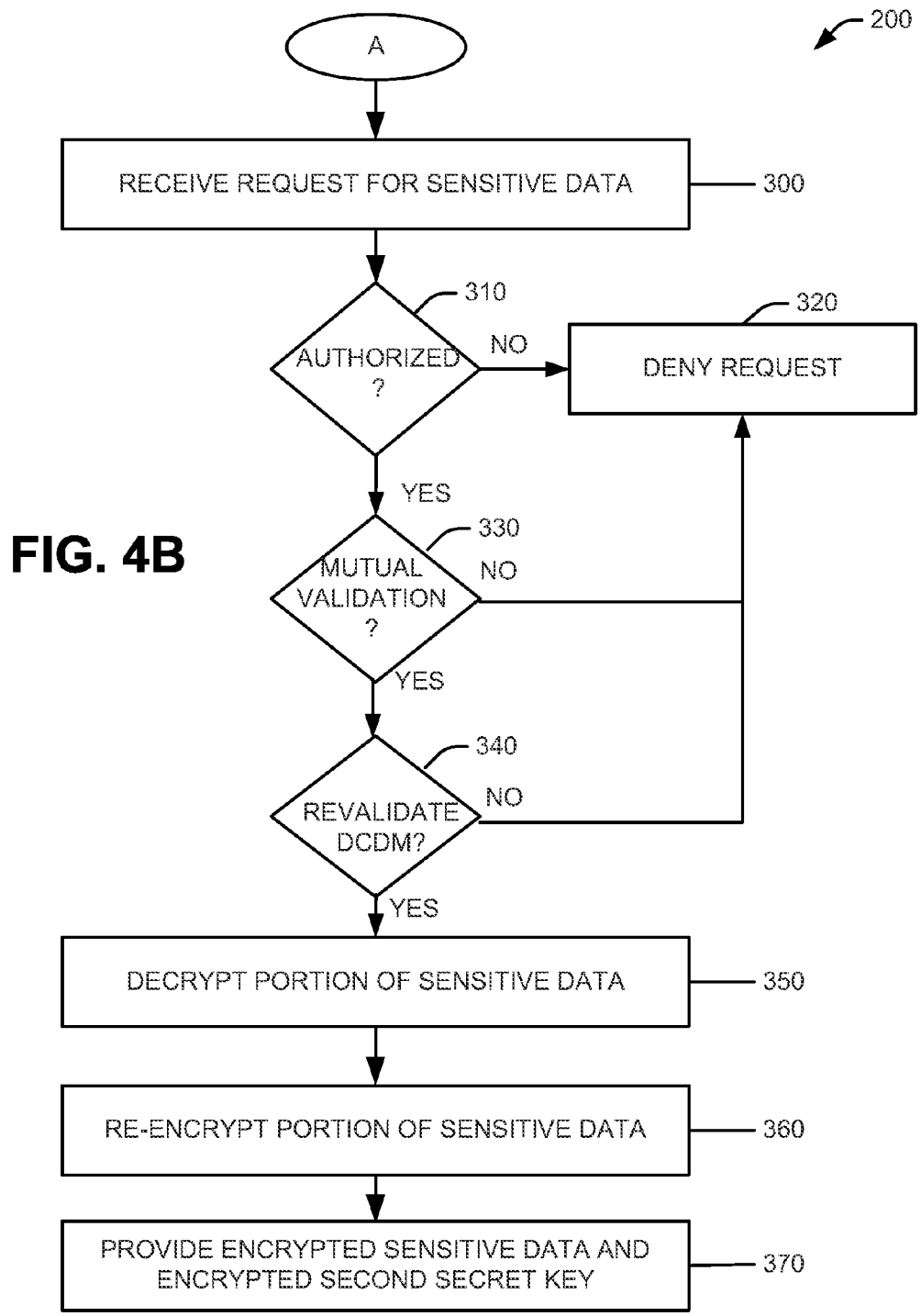

In view of the foregoing structural and functional features described above, example methodologies will be better appreciated with reference to FIGS. 4A and 4B. While, for purposes of simplicity of explanation, the example methods of FIGS. 4A and 4B are shown and described as executing serially, the present examples are not limited by the illustrated order, as some actions could in other examples occur in different orders and/or concurrently from that shown and described herein.

FIGS. 4A and 4B illustrate a flowchart of an example method 200 for controlling the use and distribution (e.g., management) of data. The method 200 could be implemented, for example, by the system 2 illustrated in FIG. 1 and/or the system 50 illustrated in FIG. 2. At 210, a request for a conformance certificate can be provided from a data manager executing in a virtual machine of a data collector (e.g., DCVM 62 of FIG. 2), which data manager can be referred to as a DCDM (e.g., DCDM 64 of FIG. 2). The request for the conformance certificate can be provided to a conforming authority. At 220, a determination is made as to whether the DCDM can be validated by the conforming authority. The validation of the DCDM can validate integrity of the DCDM, and the authenticity of a TPM of the data collector, which TPM can be referred to as a DCTPM (e.g., DCTPM 58 of FIG. 2). If the determination at 220 is negative (e.g., NO), such that the validation is not successful, the method 200 can proceed to 230. At 230 the conformance certificate is denied. If the determination at 220 is positive (e.g., YES), such that the validation is successful, the method 200 can proceed to 240. At 240, the DCDM can receive the conformance certificate.

At 250, the DCDM can send a request for sensitive data. The request for the sensitive data can be provided, for example, to a data manager that operates on a virtual machine of a data subject, which data manager can be referred to as a DSDM. The data subject can also include a TPM, which TPM can be referred to as a DSTPM. At 260, a determination can be made as to whether the DCDM and the DSDM can perform a mutual validation. The mutual validation can allow both the DCDM and the DSDM to mutually verify the integrity of each other, as well as to mutually verify the authenticity of the DCTPM, as well as the DSTPM. If the determination at 260 is negative (e.g., NO), such that the mutual validation is not successful, the method 200 can proceed to 270. If the determination at 260 is positive (e.g., YES), such that the mutual validation is successful, the method 200 can proceed to 280. At 270, the request for the sensitive data can be denied. At 280, the DCDM can store a received data certificate. The data certificate can include, for example the sensitive data requested from the data subject, as well as preferences that define limitations on the employment and distribution (e.g., management) of the sensitive data. Moreover, the sensitive data including the data certificate can be encrypted with a secret key, which secret key can be encrypted with a principal public-key of the data collector, wherein a complementary private key can be stored at the DCTPM.

At 300, the DCDM can receive a request for the sensitive data. The request can be provided, for example from a third-party that has been validated by the conforming authority. At 310 a determination can be made as to whether both the third-party and the DCDM are authorized to access the requested sensitive data. The determination can be based on, for example, an examination of the preferences set forth in the data certificate. If the determination at 310 is negative (e.g., NO), such that either the DCDM or the third-party is not authorized to access the requested sensitive data, the method 200 can proceed to 320. If the determination at 310 is positive (e.g., YES), such that both the DCDM and the third-party are authorized to access the requested sensitive data, the method 200 can proceed to 330. At 320, the request for the sensitive data can be denied. At 330, a determination can be made as to whether both the DCDM and the third-party can mutually validate each other. The mutual validation includes, for example, an integrity check of both the DCDM and the third-party, as well as an authentication of the DCTPM, and a TPM of the third-party. If the determination at 330 is negative (e.g., NO), such that the mutual validation fails, the method 200 can proceed to 320. If the determination at 330 is positive (e.g., YES), such that the mutual validation is successful, the method 200 can proceed to 340. At 340, the DCDM can be revalidated, for example, by the DCTPM to ensure that the DCDM has not been altered since the conformance certificate was provided. If the determination at 340 is negative (e.g., NO), such that the revalidation fails, the method 200 can proceed to 320. If the determination at 340 is positive (e.g., YES), such that the revalidation is successful the method 200 can proceed to 350.

At 350, the requested sensitive data in the data certificate can be decrypted. The decryption of the requested sensitive data can include, for example, providing the encrypted secret key to the DCTPM, and requesting that the secret key be decrypted with the principal private key of the data collector. Upon receiving the decrypted the secret key, the DCDM can extract the encrypted requested sensitive data from the data certificate (or other location) and decrypt it by employing the decrypted secret key. At 360, the requested sensitive data can be re-encrypted by the DCDM. The re-encryption can include, for example generating a second secret key, encrypting the requested sensitive data with the second secret key and encrypting the second secret key with a principal public-key of the third-party (which third-party's TPM stores the complementary principal private key). At 370, the encrypted sensitive data, along with the encrypted second secret key can be provided to the third-party.

The systems and methods disclosed herein do not require that, at each principal composing a communication chain, personal data can only be used by one application. The systems and methods also do not require that these principals' computing devices are equipped with specific operating systems or that these systems' hardware must be modified. Instead, the systems and methods disclosed herein rely on realistic environments and on realistic assumptions that are already verified by existing technologies. For example, the disclosed systems and methods can leverage a TPM at each platform, which TPM is already utilized in many existing and future computer systems.

What have been described above are examples. Further combinations and permutations are possible. Accordingly, this disclosure embraces all such alterations, modifications, and variations, including the appended claims.

What is claimed is:

1. A non-transitory computer readable medium storing computer executable instructions, the computer executable instructions comprising:
   instructions to execute a data manager of a data collector (DCDM) on a virtual machine of the data collector for managing sensitive data, the DCDM having a conformance certificate that characterizes functionality of the DCDM;
   instructions to request sensitive data from a data subject, wherein the request for the sensitive data includes the conformance certificate; and
   instructions to receive, in response to the request, the sensitive data encrypted with an encrypted secret key, wherein the secret key is decrypt-able with a private key stored at a trusted platform module for the data collector (DCTPM).

2. The computer readable medium of claim 1, further comprising:
   instructions to perform a mutual validation with a data manager of the data subject (DSDM) executing on a virtual machine of the data subject, the mutual validation verifying the integrity of the DCDM and the DSDM and authenticating the DCTPM and a TPM for the data subject (DSTPM).

3. The computer readable medium of claim 1, further comprising:
   instructions to receive a data certificate from the data subject (DSDC), the DSDC comprising:
   the sensitive data encrypted with the secret key;
   the encrypted secret key; and
   preference data that characterize limitations of use for the sensitive data.

4. The computer readable medium of claim 3, wherein the secret key is a first secret key, and the DCDM is further to:
   receive a request for a portion of the sensitive data from a third-party;
   perform a mutual validation with the third-party;
   decrypt the portion of the sensitive data requested by the third-party;
   re-encrypt the portion of the sensitive data requested by the third-party with a second secret key; and
   provide the second secret key to the third-party in encrypted form, wherein the second secret key in encrypted form is decrypt-able with a private key stored at a TPM associated with the third-party.

5. The computer readable medium of claim 1, further comprising:
   instructions to provide to the data subject a platform configuration register of the DCDM (DCPCR) that includes a code characterizing a state of the DCDM at a time of issuance of the conformance certificate.

6. A data collector for managing sensitive data, the data collector comprising:
   a trusted platform nodule for the data collector (DCTPM) to store and generate cryptographic keys;
   memory for storing computer executable instructions; and
   a processing unit for accessing the memory and executing the computer executable instructions, the computer executable instructions comprising:
   a virtual machine comprising a data manager for the data collector (DCDM) having a conformance certificate that characterizes functionality of the DCDM;
   wherein the DCTPM stores a program configuration register for the data manager (DCPCR) that includes a code generated based on a state of the DCDM at a time of issuance of the conformance certificate;
   wherein the DCDM is to:
   request sensitive data from a data manager of a data subject (DSDM) operating in a virtual machine of the data subject, wherein the request includes the conformance certificate and the DCPCR;
   mutually validate the DCDM and the DSDM, wherein the mutual validation verifies the integrity of the DCDM and the DSDM, and authenticates the DCTPM and a trusted platform module of the DSDM (DSTPM); and
   receive a data certificate from the DSDM (DSDC) that includes encrypted sensitive data and preferences that characterize limitations on the use of the encrypted sensitive data.

7. The data collector of claim 6, wherein, during the mutual validation, the DCDM is further to:
   receive (i) a conformance certificate from the DSDM that characterizes functionality of the DSDM, (ii) a program configuration register for the data subject (DSPCR) that includes a code generated based on a state of the DSDM at a time the conformance certificate for the DSDM was issued, and (iii) a stored measurement log generated by the DSTPM that characterizes a current state of the DSDM;
   generate a program configuration register for the data subject based on the received stored measurement log; and
   compare the generated program configuration register for the data subject with the DSPCR to verify the integrity of the DSDM.

8. The data collector of claim 7, wherein the DSPCR is signed by a private identity key stored at the DSTPM.

9. The data collector of claim 8, wherein, during the mutual validation, the DCDM is further to receive a signed nonce, wherein the nonce is generated by the DCDM and signed by a private identity key stored at the DSTPM.

10. The data collector of claim 6, wherein the DCDM is further to access a portion of the sensitive data identified in the DSDC, the accessing comprising:
    examining the preferences of the DSDC to determine if the DSDM has authorization to access the portion of the sensitive data;
    providing the encrypted secret key to the DCTPM; and
    receiving the decrypted secret key from the DCTPM in response to the DCTPM revalidating the DCDM.

11. The data collector of claim 6, wherein the secret key is a first secret key, and wherein the DCDM is further to access a portion of the sensitive data identified in the DSDC in response to a request for the portion of the sensitive data from a third-party, the accessing comprising:
  examining the preferences of the DSDC to determine if the DCDM and the third-party have authorization to access the portion of the sensitive data requested by the third-party;
  receiving a decrypted first secret key from the DCTPM upon the DCTPM revalidating the DCDM;
  decrypting the portion of the sensitive data requested by the third-party with the decrypted first secret key;
  re-encrypting the portion of the sensitive data requested by the third-party with a second private key; and
  encrypting the second secret key wherein the second secret key is decrypt-able with a principal private key stored at a TPM of the third-party.

12. The data collector of claim 11, wherein the DCDM is further to delete the decrypted portion of the sensitive data requested by the third-party in response to the re-encrypting.

13. The data collector of claim 11, wherein the DCDM is further to:
  change the preferences set in the DSDC in response to a message from the DSDM requesting a change to the preferences for the portion of the sensitive data requested by the third-party; and
  providing a message to the third-party requesting the change to the preferences for the portion of the sensitive data requested by the third-party.

14. The data collector of claim 6, wherein the DCDM is further to:
  access a portion of the sensitive data in response to a request from a third-party, the accessing comprising:
    examining the preferences of the DSDC to determine if the DCDM and the third-party have authorization to access the portion of the sensitive data requested by the third-party; and
    denying the request for the portion of the sensitive data requested by the third-party in response to determining that the third-party is not identified in the DSDC as an authorized target for the portion of the sensitive data requested by the third-party.

15. A method for managing sensitive data, the method comprising:
  providing, from a data manager of a data collector (DCDM) executing in a virtual machine of the data collector, a request for a conformance certificate to a conforming authority, the conformance certificate characterizing a functionality of the DCDM;
  validating the DCDM, such that the integrity of the DCDM is verified, and a trusted platform module (TPM) of the data collector (DCTPM) is validated;
  sending, from the DCDM, a request tier sensitive data to a data manager of a data subject (DSDM) executing in a virtual machine of the data subject;
  mutually validating the DCDM and the DSDM, such that the integrity of the DCDM and the DSDM are verified and the DCTPM and a TPM of the data subject (DSTPM) are authenticated;
  storing, at the DCDM, a data certificate that includes:
    the sensitive data encrypted with a first secret key;
    preferences that characterize limitations of use of the sensitive data; and
    the first secret key encrypted with a principal public key of the data collector, wherein a complementary principal private key is stored at the DCTPM;
  determining, at the DCDM in response to a request for a portion of the sensitive data from a third-party, if both the third-party and the DCDM are authorized to access the portion of the sensitive data requested by the third-party;
  mutually validating the DCDM and the third-party;
  revalidating the DCDM;
  decrypting the portion of the sensitive data requested by the third-party with the first secret key, wherein the first secret key is decrypted by the DCTPM;
  re-encrypting, at the DCDM, the portion of the sensitive data requested by the third-party with a second secret key; and
  providing the third-party (i) the re-encrypted portion of the sensitive data requested by the third-party and GO the second secret key in encrypted form, wherein the encrypted form of the second secret key is decrypt-able with a private key stored at a TPM of the third-party.

* * * * *

UNITED STATES PATENT AND TRADEMARK OFFICE
CERTIFICATE OF CORRECTION

PATENT NO. : 9,064,129 B2  Page 1 of 1
APPLICATION NO. : 13/882692
DATED : June 23, 2015
INVENTOR(S) : Gina Kounga et al.

It is certified that error appears in the above-identified patent and that said Letters Patent is hereby corrected as shown below:

In the Claims

In column 12, line 11, in Claim 6, delete "nodule" and insert -- module --, therefor.

In column 14, line 11 approx., in Claim 15, delete "tier" and insert -- for --, therefor.

In column 14, line 39 approx., in Claim 15, delete "GO" and insert -- (ii) --, therefor.

Signed and Sealed this
Sixteenth Day of February, 2016

Michelle K. Lee
*Director of the United States Patent and Trademark Office*